(12) United States Patent
Persson

(10) Patent No.: US 11,892,073 B2
(45) Date of Patent: Feb. 6, 2024

(54) GEARWHEEL ARRANGEMENT

(71) Applicant: VOLVO TRUCK CORPORATION, Gothenburg (SE)

(72) Inventor: Adam Skyllberg Persson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/485,983

(22) Filed: Sep. 27, 2021

(65) Prior Publication Data

US 2022/0099170 A1   Mar. 31, 2022

(30) Foreign Application Priority Data

Sep. 29, 2020 (EP) .................................... 20198956

(51) Int. Cl.
*F16H 57/04* (2010.01)
*F16H 55/17* (2006.01)

(52) U.S. Cl.
CPC .......... *F16H 57/043* (2013.01); *F16H 55/17* (2013.01); *F16H 57/0426* (2013.01); *F16H 57/0456* (2013.01); *F16H 57/0427* (2013.01); *F16H 57/0493* (2013.01)

(58) Field of Classification Search
CPC .. F16H 57/0426; F16H 57/0247; F16H 55/17; F16H 57/04; F16H 57/042; F16H 57/043; F16H 57/0456; F16H 57/0493
See application file for complete search history.

(56) References Cited

U.S. PATENT DOCUMENTS

| | | | |
|---|---|---|---|
| 5,094,039 A | 3/1992 | Yoshioka | |
| 6,315,691 B1 * | 11/2001 | Fredriksen | F16H 47/04 475/72 |
| 6,875,111 B1 * | 4/2005 | Rowell | F16H 57/043 464/7 |

(Continued)

FOREIGN PATENT DOCUMENTS

| | | | |
|---|---|---|---|
| DE | 1268446 B | * | 5/1968 |
| GB | 270876 A | | 5/1927 |
| JP | S52-103276 U | | 8/1977 |

OTHER PUBLICATIONS

DE 1268446 B (Hans Nedwidek) May 16, 1968 (Description). [online] [retrieved on Feb. 23, 2023]. Retrieved from Espacenet. (Year: 1968).*

(Continued)

*Primary Examiner* — Joseph Brown
(74) *Attorney, Agent, or Firm* — Sage Patent Group

(57) ABSTRACT

A gearwheel arrangement for a transmission of a vehicle, including:
a gearwheel configured to be rotatable about an axis of rotation (A), the gearwheel including a gearwheel body and an annular gear tooth section extending around the gearwheel body, the gear tooth section including a plurality of external gear teeth, wherein at least a part of the gear tooth section extends past a radially outer portion of the gearwheel body in an axial direction (A) of the gearwheel, so that at least one radially inwardly facing surface is provided opposite of the external gear teeth,
means for guiding cooling fluid toward the at least one radially inwardly facing surface so as to cool the gear tooth section during rotation of the gearwheel about the axis of rotation.

9 Claims, 2 Drawing Sheets

(56) References Cited

U.S. PATENT DOCUMENTS

2007/0175706 A1 8/2007 Shilo et al.
2021/0102619 A1* 4/2021 Cliff .................... F16H 57/043

OTHER PUBLICATIONS

Wikipedia contributors. "Motor oil." Wikipedia, The Free Encyclopedia. Wikipedia, The Free Encyclopedia, Sep. 24, 2020. Web. Jun. 1, 2023. (Year: 2020).*
Extended European Search Report, EP20198956.3, dated Mar. 12, 2021, 9 pages.

* cited by examiner

GEARWHEEL ARRANGEMENT

CROSS REFERENCE TO RELATED APPLICATIONS

This application claims foreign priority to European Patent Application No. 20198956.3, filed on Sep. 29, 2020, the disclosure and content of which is incorporated by reference herein in its entirety.

TECHNICAL FIELD

The invention relates to a gearwheel arrangement, a transmission for a vehicle, a powertrain of a vehicle, and a vehicle.

The invention can be applied in heavy-duty vehicles, such as trucks, buses and construction equipment. Although the invention will be described with respect to a truck, the invention is not restricted to this particular vehicle, but may also be used in other vehicles such as buses, trailers, wheel loaders, excavators, passenger cars, etc. The invention is particularly applicable in electrically operated vehicles, powered by one or more electric machines.

BACKGROUND

In vehicle transmissions, cooling and lubrication of gearwheels are commonly achieved by providing a cooling fluid sump, or cooling fluid bath, in a housing of the transmission, into which gear teeth of some of the gearwheels are immersed. The cooling fluid may e.g. be oil, or another cooling fluid which may also function as a lubricant. The meshing engagement of the gear teeth ensures that the cooling fluid spreads to the gearwheels not being immersed into the cooling fluid sump. Another method is to provide lubricant from above, for example by dripping or spraying lubricant onto the gear teeth. These are simple and efficient ways of providing efficient cooling in transmissions of vehicles driven by an internal combustion engine.

However, in electrically operated vehicles provided with one or more electric machines for propulsion of the vehicle, the rotational speeds of the gearwheels in the transmission may often be significantly higher than in the case of a vehicle powered by an internal combustion engine, since electric machines are typically operated at higher rotational speeds than internal combustion engines. In particular, this is valid for heavy-duty vehicles in which large gear ratios are necessary. This leads to problems with lubrication and cooling of the gearwheels, since the rapidly rotating gearwheels tend to throw cooling fluid provided by means of e.g. an oil sump outward and prevent efficient cooling of the gearwheels.

SUMMARY

A primary object of the invention is to alleviate the above defined problem relating to gearwheel cooling. In particular, it is an object to provide a gearwheel arrangement suitable for use in transmissions of electric or partially electric powertrains, in which efficient gearwheel cooling may be achieved.

According to a first aspect of the invention, at least the primary object is achieved by a gearwheel arrangement according to claim 1.

The gearwheel arrangement comprises:
a gearwheel configured to be rotatable about an axis of rotation, the gearwheel comprising a gearwheel body and an annular gear tooth section extending around the gearwheel body, the gear tooth section comprising a plurality of external gear teeth,
wherein at least a part of the gear tooth section extends past a radially outer portion of the gearwheel body in an axial direction of the gearwheel, so that at least one radially inwardly facing surface is provided opposite of the external gear teeth,
means for guiding cooling fluid toward the at least one radially inwardly facing surface so as to cool the gear tooth section during rotation of the gearwheel about the axis of rotation.

Thus, instead of being provided to the gear teeth from a position radially outside of the annular gear tooth section, as in the case of a cooling fluid bath or a cooling fluid sump, the cooling fluid is provided to the gear tooth section from a position radially inside of the gear tooth section. By guiding cooling fluid toward the radially inwardly facing surface(s), provided opposite of the external gear teeth as seen in a radial direction of the gearwheel, the rotation of the gearwheel results in cooling fluid being pressed toward the radially inwardly facing surface, radially inside of the gear teeth. The cooling fluid thereby cools the gear teeth during rotation of the gearwheel. The cooling fluid may be any liquid cooling fluid, which may be provided by, for example, spraying it or dripping it onto the radially inwardly facing surface. The cooling fluid may for example be an oil based cooling fluid, or a water-based cooling fluid or another liquid cooling fluid.

The provision of cooling fluid toward the at least one radially inwardly facing surface results in efficient cooling during meshing engagement of the gearwheel with an opposing gearwheel. In particular, efficient cooling is achieved at relatively high rotational speeds of the gearwheel, since the cooling fluid is provided radially inside of the meshing gear teeth and is therefore pressed/forced toward the radially inwardly facing surface by centrifugal forces as the gearwheel rotates.

The annular gear tooth section extends around the gearwheel body, i.e. it is provided radially outside of the gearwheel body.

The annular gear tooth section of the gearwheel arrangement does not comprise any conduit or bore extending from the radially inwardly facing surface to the external gear teeth.

Optionally, the at least one radially inwardly facing surface comprises a first annular surface extending between a first side surface of the gear tooth section and a first side surface of the gearwheel body. By a side surface is herein understood a surface facing backward or forward in the axial direction. The side surface may be parallel with a radial direction of the gearwheel, or it may be angled with respect to the radial direction. The annular surface efficiently spreads the cooling fluid around the annular gear tooth section.

Optionally, the at least one radially inwardly facing surface further comprises a second annular surface extending between a second side surface of the gear tooth section and a second side surface of the gearwheel body, the first and the second annular surfaces being formed on axially opposite sides of the radially outer portion of the gearwheel body. Thus, cooling fluid may be provided at both sides of the gearwheel body.

Optionally, the at least one radially inwardly facing surface forms part of at least one annular groove extending around the axis of rotation. As seen in a sectional plane including the axis of rotation of the gearwheel, the at least one radially inwardly facing surface forms a recess in the gear tooth section. The groove controls the flow of cooling fluid and prevents the cooling fluid from flowing off the radially inwardly facing surface, such as the annular surface, in an uncontrolled way.

Optionally, the gear tooth section comprises an annular flange delimiting the at least one radially inwardly facing surface in the axial direction. The radially inwardly facing surface may thus in the axial direction be delimited by on one hand a side surface of the gearwheel body, and on the other hand by the flange. The flange controls the flow of cooling fluid and prevents the cooling fluid from flowing off the radially inwardly facing surface, such as the annular surface, in an uncontrolled way. The flange may form part of the gearwheel, i.e. be formed by machining of the gearwheel. The flange may also be a separate part mounted on the gearwheel. In this case, the flange may be a ring shaped component mounted axially outside of the radially inwardly facing surface.

Optionally, the means for guiding cooling fluid toward the at least one radially inwardly facing surface comprises a conduit having an outlet via which cooling fluid may be provided to the at least one radially inwardly facing surface. The conduit may be provided within the gearwheel body, or outside of the gearwheel body.

Optionally, the conduit is arranged separately from the gearwheel. An advantage of this is that the strength of the gearwheel body is not compromised, since the gearwheel body may be produced without any internal conduits in the form of bores or similar. The conduit may e.g. be made of a synthetic material and be in the form of a hose or a tube. Preferably, the conduit may be formed of a flexible material, which is possible to bend and may be easily mounted.

Optionally, the outlet comprises a nozzle provided radially inside of the at least one radially inwardly facing surface. The nozzle may be configured for spraying cooling fluid toward the at least one radially inwardly facing surface.

Optionally, the means for guiding cooling fluid further comprises a pump for providing the cooling fluid to the outlet.

Optionally, the conduit is formed in the gearwheel body. An advantage of this is that a space efficient solution for cooling may be achieved. The conduit may e.g. be formed as one or more bores within the gearwheel body, wherein one or more outlets are provided in a vicinity of the radially inwardly facing surface.

Optionally, the conduit is configured for receiving cooling fluid provided via a shaft on which the gearwheel is mounted. This contributes to space efficiency. In some embodiments, the gearwheel may in this case be rotationally fixed on the shaft, the shaft and the gearwheel being configured for common rotation about the axis of rotation. However, in other embodiments, the gearwheel may be rotatably mounted on the shaft via which cooling fluid is provided.

According to a second aspect of the invention, at least the primary object is also achieved by a transmission for a vehicle, the transmission comprising a shaft extending in the axial direction and a gearwheel arrangement according to the first aspect, the gearwheel of the gearwheel arrangement being provided on the shaft. By the gearwheel being provided on the shaft, it is to be understood that the gearwheel may be either a separate component mounted on the shaft, or that the gearwheel may be integrally formed with the shaft as a single component. Advantages and advantageous features of the transmission appear from the above description of the first aspect of the invention.

The transmission may further comprise a second shaft and a second gearwheel arrangement according to the first aspect, the gearwheel of the second gearwheel arrangement being provided on the second shaft, and the gearwheel of the second gearwheel arrangement being in meshing engagement with the gearwheel of the first gearwheel arrangement. The transmission may also comprise further shafts and gearwheel arrangements. For example, the transmission may comprise a single drive shaft and one, two, or more driven shafts. Alternatively, the transmission may comprise one, two or more drive shafts and a single driven shaft.

According to a third aspect of the invention, at least the primary object is also achieved by a powertrain of a vehicle, comprising a gearwheel arrangement according to the first aspect, and/or a transmission according to the second aspect. Advantages and advantageous features of the powertrain appear from the above description of the first and second aspects of the invention.

Optionally, the powertrain further comprises at least one electric machine configured for propulsion of the vehicle, and/or at least one other propulsion unit configured to be operated at a high rotational speed. Such a propulsion unit may for example be a turbo compound engine, or an engine using a Rankine cycle to recover heat from exhaust.

According to a fourth aspect of the invention, at least the primary object is also achieved by a vehicle comprising a gearwheel arrangement according to the first aspect, and/or a transmission according to the second aspect, and/or a powertrain according to the third aspect. Advantages and advantageous features of the vehicle appear from the above description of the other aspects of the invention.

The vehicle may optionally be a fully electrified vehicle, or a hybrid vehicle comprising at least one combustion engine in addition to one or more electric machines.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

Figure 1:
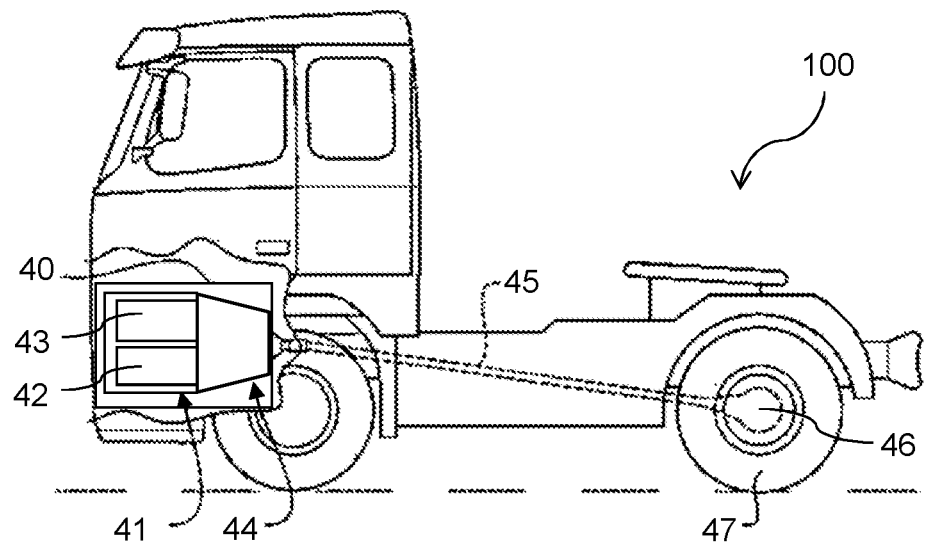
FIG. 1 is a side view of a vehicle in which a gearwheel arrangement according to the invention may be applied.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

A vehicle 100 in the form of a truck according to an example embodiment of the invention is schematically shown in FIG. 1. The vehicle 100 includes a powertrain 40 with an electric machine assembly 41 for propulsion of the vehicle 100. The electric machine assembly 41 comprises in the shown embodiment two electric machines 42, 43, connected to a transmission 44. The transmission 44 is arranged to transfer torque from the electric machine assembly 41 to a drive shaft 45 connecting the transmission 44 to a driving axle 46 that drives driving wheels 47 of the vehicle 100. Thus, in the shown embodiment, the vehicle 100 is a fully electrified vehicle configured to be driven solely by the electric machine assembly 41. The vehicle 100 may be arranged with more than one driving axle, such as two or more driving axles.

Although the electric machine assembly 41 is in FIG. 1 illustrated to be located in the front of the vehicle 100, other powertrain configurations are possible. In alternative embodiments, the powertrain of the vehicle may be integrated with the driving axle(s) of the vehicle, such as one or more rear axles, or with the driving wheels or hubs.

The electric machine assembly 41 of the vehicle 100 may comprise only one electric machine, or alternatively more than two electric machines, such as three or four electric machines. The vehicle may also be a hybrid vehicle, provided with a combustion engine in addition to the electric machine assembly 41. The electric machine(s) may be in the form of electric motor(s)/generator(s).

Figure 2:
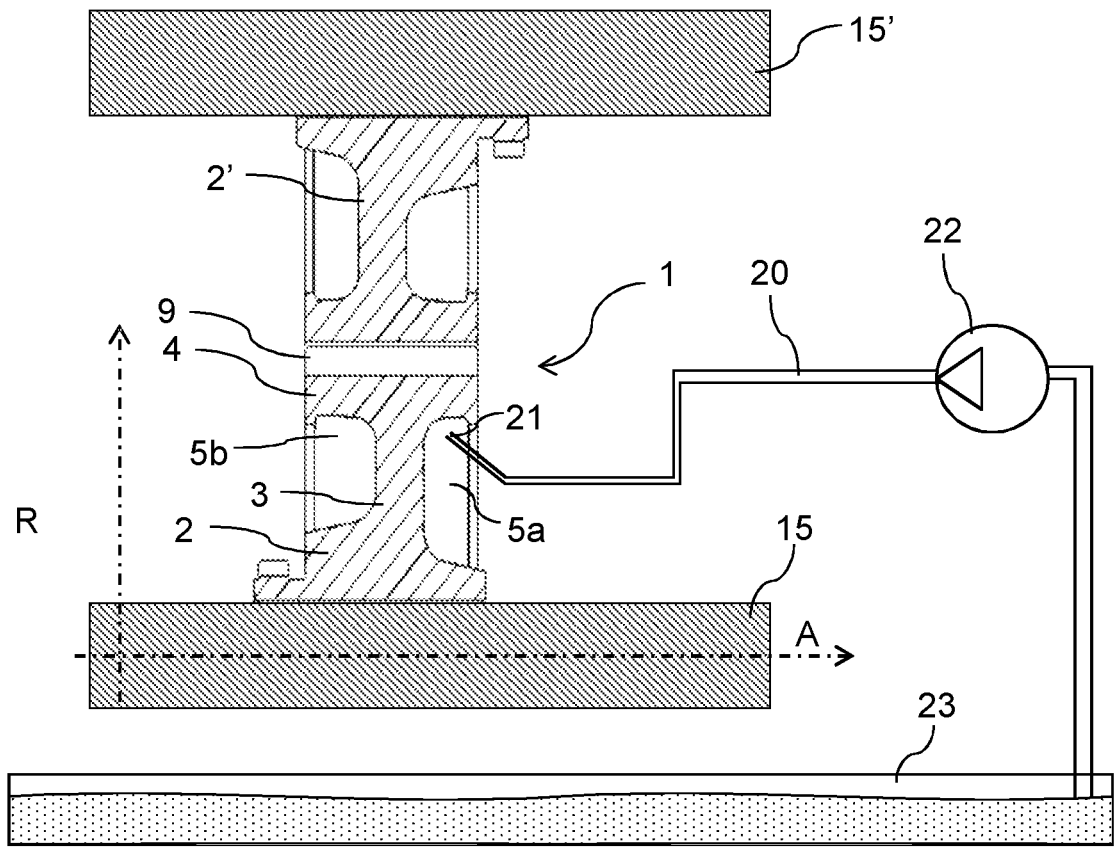
FIG. 2 is a sectional view showing parts of a gearwheel arrangement according to a first embodiment.
Figure 3:
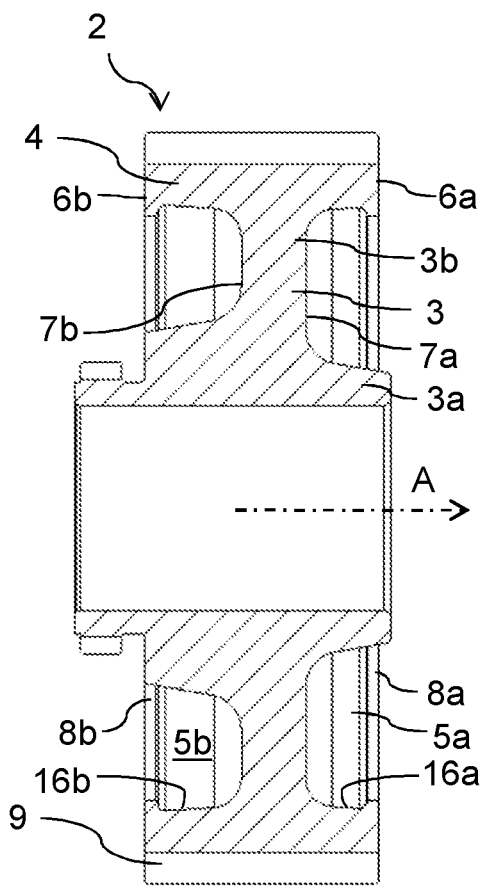
FIG. 3 is a sectional view showing a gearwheel of the gearwheel arrangement in FIG. 2.

Parts of a gearwheel arrangement 1 according to a first embodiment of the invention are illustrated in FIG. 2. The gearwheel arrangement 1 may form part of a transmission of a vehicle, such as of the transmission 44 of the vehicle 100 shown in FIG. 1. Reference is also made to FIG. 3, showing a gearwheel 2 of the gearwheel arrangement 1 according to the first embodiment.

Figure 4:
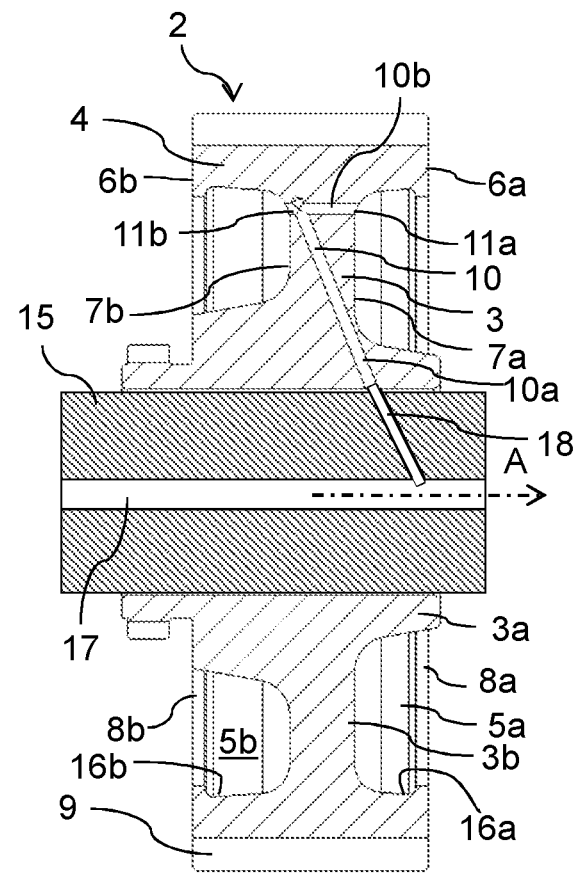
FIG. 4 is a sectional view of a gearwheel arrangement according to a second embodiment.

Parts of a gearwheel arrangement 1 according to a second embodiment are illustrated in FIG. 4. Common features of the first and second embodiments will be described in the following.

The gearwheel 2 is configured to be rotatable about an axis of rotation A. The gearwheel 2 may be mounted on, or integrated with, a shaft 15 extending along the axis of rotation A, defining an axial direction A. The gearwheel 2 may in both embodiments be either rotatably mounted on the shaft 15, or it may be fixed for common rotation with the shaft 15, depending on the configuration of the transmission in which the gearwheel arrangement is located.

As shown in FIG. 2, the gearwheel 2 is configured for meshing arrangement with an opposing gearwheel 2', which is mounted on a shaft 15' extending in parallel to the shaft 15. Thus, torque may be transferred between the shafts 15, 15' via the gearwheels 2, 2'. In the shown first embodiment, the gearwheels 2, 2' are shown to be identical, but different configurations are of course possible as may be readily understood by a person skilled in the art.

The gearwheel 2 comprises a gearwheel body 3 and an annular gear tooth section 4 provided outside of the gearwheel body 2 as seen in a radial direction R. The annular gear tooth section 4 thus extends around the gearwheel body 2. The gear tooth section 4 comprises a plurality of external gear teeth 9 configured for meshing engagement with gear teeth of the opposing gearwheel 2'. In the shown embodiments, the gearwheel body 3 comprises a radially inner portion 3a, closest to the shaft 15, and a radially outer portion 3b provided radially outside of the radially inner portion 3a. The radially outer portion 3b has a smaller width than the radially inner portion 3a, as measured in the axial direction A.

The gear tooth section 4 extends past the radially outer portion 3b of the gearwheel body 3 in the axial direction A of the gearwheel 2. Two radially inwardly facing surfaces 5a, 5b are thereby provided on the gear tooth section 4, opposite of the external gear teeth 9 as seen in the radial direction R. The gearwheel 2 is in the axial direction A delimited by first and second side surfaces 6a, 6b of the gear tooth section 4 and by first and second side surfaces 7a, 7b of the gearwheel body 3. The radially inwardly facing surfaces 5a, 5b are in the shown embodiment a first annular surface 5a extending in a first annular groove formed between the forward-facing first side surface 6a of the gear tooth section 4 and the forward-facing first side surface 7a of the gearwheel body 3, and a second annular surface 5b extending in a second annular groove formed between the rearward-facing second side surface 6b of the gear tooth section 4 and the rearward-facing second side surface 7b of the gearwheel body 3. As seen in a sectional plane including the axis of rotation A of the gearwheel 2, as shown in FIGS. 3-4, the radially inwardly facing surfaces 5a, 5b thus form recesses 16a, 16b in the gear tooth section 4. The first and the second annular surfaces 5a, 5b are formed on axially opposite sides of the radially outer portion 3b of the gearwheel body 3.

Annular flanges 8a, 8b, protruding radially inward from the gear tooth section 4, delimit the first and second annular surfaces 5a, 5b, respectively, in the axial direction A. The annular flanges 8a, 8b may be formed by machining of the gearwheel 2, or they may alternatively be formed as separate annular components which are attached to the gear tooth section 4.

The gearwheel arrangement 1 further comprises means for guiding cooling fluid toward the radially inwardly facing surface 5a so as to cool the gear tooth section 4 during rotation of the gearwheel 2 about the axis of rotation A. Of course, the means for providing cooling fluid may be arranged for guiding cooling fluid toward both of the radially inwardly facing surfaces 5a, 5b. The first and the second embodiments differ in the configuration of the means for guiding cooling fluid, as will be further described in the following.

In the first embodiment shown in FIGS. 2-3, the means for guiding cooling fluid comprises a separately formed conduit 20, such as a hose or a tube, having an outlet 21 arranged radially inside of the first annular surface 5a. The conduit is connected to a cooling fluid tank 23, which may be in the form of e.g. an oil sump located below the gearwheel 2. A pump 22 is provided for pumping the cooling fluid from the tank/oil sump 23, via the conduit 20, to a nozzle provided at the outlet 21. The nozzle is herein configured for spraying cooling fluid toward the first annular surface 5a. Cooling fluid may thus be circulated within a housing (not shown) of the gearwheel arrangement 1. Although the outlet 21 is in the shown embodiment shown to be directed toward the first annular surface 5a, it is sufficient that it is provided radially inside of this surface and directed toward the gearwheel 2. Rotational forces will then force the cooling fluid toward the first annular surface 5a, and/or toward the second annular surface 5b.

In the gearwheel arrangement 1 according to the second embodiment shown in FIG. 4, the gearwheel arrangement is configured for providing cooling fluid via the gearwheel body 3. The means for guiding cooling fluid herein comprises a T-shaped conduit 10, which is formed within the gearwheel body 3. The conduit 10 has a first outlet 11a provided just radially inside of the first annular surface 5a, and a second outlet 11b provided just radially inside of the second annular surface 5b. Of course, a plurality of angularly separated conduits, such as the conduit 10, may be provided within the gearwheel body 3, for providing cooling fluid at various positions around the first and second annular surfaces 5a, 5b. The conduit 10 is in the shown embodiment formed by two bores within the gearwheel body 3. A first bore 10a, extending backward and radially outward with respect to the axis of rotation A, can be formed by drilling a blind hole from a position radially inside of the gearwheel body 3. A second bore 10b can be formed by drilling a through-hole extending in the axial direction A between the first side surface 7a and the second side surface 7b. The first bore 10a extends into the second bore 10b so that the cooling fluid provided via the first bore 10a may be pumped to the outlets 11a, 11b via the second bore 10b.

As mentioned earlier, the gearwheel 2 is in the second embodiment fixed for common rotation with the shaft 15. The conduit 10 is in this embodiment configured for receiving cooling fluid provided via the shaft 15 on which the gearwheel 2 is mounted. For this purpose, the shaft 15 comprises a central longitudinal channel 17, e.g. a bore, and an intermediate conduit 18 extending between the channel 17 and the conduit 10 of the gearwheel 2. The intermediate conduit 18 thus fluidly connects the channel 17 to the conduit 10. Similarly to the first embodiment, a pump (not shown) may be provided for pumping cooling fluid to the outlets 11a, 11b via the channel 17 and the conduits 18, 10, and cooling fluid may be circulated within e.g. a housing (not shown) of the gearwheel arrangement 1.

During operation of the gearwheel arrangement 1 according to the first and the second embodiments, cooling fluid is pumped to the outlets 11a, 11b, 21 as the gearwheel 2 is rotating. The centrifugal forces press the cooling fluid outward, toward the radially inwardly facing surfaces 5a, 5b. The flanges 8a, 8b ensure that a sufficient amount of cooling fluid is present at the radially inwardly facing surfaces 5a, 5b to achieve efficient cooling of the gear tooth section 4.

A transmission for a vehicle, such as the transmission 44 of the vehicle 100 shown in FIG. 1, may comprise a plurality of gearwheel arrangements 1 as described above. In embodiments in which a separately arranged conduit 20 is provided for guiding cooling fluid, such as in the first embodiment, the outlets 21 and shift forks (not shown) for changing gears may be provided at radially opposite positions of the shaft 15, so as to achieve a space efficient arrangement.

It is to be understood that the present invention is not limited to the embodiments described above and illustrated in the drawings; rather, the skilled person will recognize that many changes and modifications may be made within the scope of the appended claims.

The invention claimed is:

1. A gearwheel arrangement, comprising:
a gearwheel configured to be rotatable about an axis of rotation, the gearwheel comprising a gearwheel body and an annular gear tooth section extending around the gearwheel body, the gear tooth section comprising a plurality of external gear teeth,
wherein at least a part of the gear tooth section extends past a radially outer portion of the gearwheel body in an axial direction of the gearwheel, so that at least one radially inwardly facing surface is provided opposite of the external gear teeth, means for guiding cooling fluid toward the at least one radially inwardly facing surface so as to cool the gear tooth section during rotation of the gearwheel about the axis of rotation,
wherein the at least one radially inwardly facing surface comprises a first annular surface extending between a first side surface of the gear tooth section and a first side surface of the gearwheel body, and a second annular surface extending between a second side surface of the gear tooth section and a second side surface of the gearwheel body, the first and the second annular surfaces being formed on axially opposite sides of the radially outer portion of the gearwheel body,
wherein the means for guiding cooling fluid toward the at least one radially inwardly facing surface comprises a conduit, which is formed within the gearwheel body, the conduit being configured for receiving cooling fluid provided via a shaft on which the gearwheel is mounted, the conduit having a first outlet provided just radially inside of the first annular surface, and a second outlet provided just radially inside of the second annular surface, via which cooling fluid may be provided to the at least one radially inwardly facing surface, and
wherein the gear tooth section comprises an annular flange delimiting the at least one radially inwardly facing surface in the axial direction.

2. The gearwheel arrangement according to claim 1, wherein the at least one radially inwardly facing surface forms part of at least one annular groove extending around the axis of rotation.

3. The gearwheel arrangement according to claim 1, wherein the means for guiding cooling fluid further comprises a pump for providing the cooling fluid to the outlet.

4. A transmission for a vehicle, the transmission comprising the shaft extending in the axial direction and the gearwheel arrangement according to claim 1, the gearwheel of the gearwheel arrangement being provided on the shaft.

5. A powertrain of a vehicle, comprising the transmission according to claim 4.

6. The powertrain according to claim 5, further comprising at least one electric machine configured for propulsion of the vehicle, and/or at least one other propulsion unit comprising at least one of a turbo compound engine and an engine using a Rankine cycle to recover heat from exhaust.

7. A vehicle comprising the gearwheel arrangement according to claim 1, a transmission comprising the shaft extending in the axial direction, and a powertrain comprising at least one electric machine configured for propulsion of the vehicle, and/or at least one other propulsion unit comprising at least one of a turbo compound engine and an engine using a Rankine cycle to recover heat from exhaust.

8. A powertrain of a vehicle, comprising the gearwheel arrangement according to claim 1.

9. The powertrain according to claim 8, further comprising at least one electric machine configured for propulsion of the vehicle, and/or at least one other propulsion unit comprising at least one of a turbo compound engine and an engine using a Rankine cycle to recover heat from exhaust.

* * * * *